United States Patent
Kamiya et al.

(10) Patent No.: US 10,965,880 B2
(45) Date of Patent: Mar. 30, 2021

(54) INFORMATION PROCESSING APPARATUS, INFORMATION PROCESSING METHOD, AND INFORMATION PROCESSING PROGRAM

(71) Applicant: FUJIFILM Corporation, Tokyo (JP)

(72) Inventors: Takeshi Kamiya, Saitama (JP); Masahiko Sugimoto, Saitama (JP); Yoshiaki Ishii, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/789,846

(22) Filed: Feb. 13, 2020

(65) Prior Publication Data

US 2020/0186692 A1 Jun. 11, 2020

Related U.S. Application Data

(63) Continuation of application No. PCT/JP2018/025652, filed on Jul. 6, 2018.

(30) Foreign Application Priority Data

Sep. 11, 2017 (JP) .............................. JP2017-173925

(51) Int. Cl.
- *H04N 5/235* (2006.01)
- *H04N 5/232* (2006.01)
- *H04N 1/21* (2006.01)

(52) U.S. Cl.
CPC ........... *H04N 5/2356* (2013.01); *H04N 1/215* (2013.01); *H04N 5/232* (2013.01)

(58) Field of Classification Search
None
See application file for complete search history.

(56) References Cited

U.S. PATENT DOCUMENTS

2010/0103279 A1\* 4/2010 Shiratani ............ H04N 5/23219
   348/222.1
2011/0202523 A1\* 8/2011 Ota ....................... G06F 16/583
   707/722

(Continued)

FOREIGN PATENT DOCUMENTS

CN     103888661 A    6/2014
JP     2003-33498 A   11/2003

(Continued)

OTHER PUBLICATIONS

International Preliminary Report on Patentability and Written Opinion of the International Searching Authority (forms PCT/IB/373, PCT/ISA/237 and PCT/IB326), dated Mar. 26, 2020, for corresponding International Application No. PCT/JP2018/025652, with a Written Opinion translation.

(Continued)

*Primary Examiner* — Quan Pham
(74) *Attorney, Agent, or Firm* — Birch, Stewart, Kolasch & Birch, LLP (57) ABSTRACT

An information processing apparatus 14 includes a reception unit 22 that receives information based on a captured image obtained by an imaging device, an extraction unit 28 that extract a plurality of image data of which a degree of similarity with a subject specified by the information received by the reception unit 22 is equal to or greater than a predetermined value from a first image data group obtained by the bracket imaging and/or a second image data group obtained by non-bracket imaging which are accumulated in advance, a generation unit 30 that generates the imaging condition of the bracket imaging by using the plurality of image data extracted by the extraction unit 28, and a transmission unit 32 that transmits the imaging con- (Continued)

dition of the bracket imaging generated by the generation unit 30 to the imaging device.

11 Claims, 5 Drawing Sheets

(56) References Cited

U.S. PATENT DOCUMENTS

| | | | |
|---|---|---|---|
| 2011/0273471 A1* | 11/2011 | Nagasaka | H04N 5/232122 345/619 |
| 2014/0176758 A1 | 6/2014 | Fujita | |
| 2015/0288869 A1 | 10/2015 | Furuhashi | |

FOREIGN PATENT DOCUMENTS

| | | |
|---|---|---|
| JP | 2004-23352 A | 1/2004 |
| JP | 2008-66886 A | 3/2008 |
| JP | 2009-55088 A | 3/2009 |
| JP | 2013-85190 A | 5/2013 |
| JP | 2014-120815 A | 6/2014 |
| JP | 2014-127997 A | 7/2014 |

OTHER PUBLICATIONS

International Search Report (form PCT/ISA/210), dated Sep. 25, 2018, for corresponding International Application No. PCT/JP2018/025652, with an English translation.
Chinese Office Action and Search Report for corresponding Chinese Application No. 201880056078.1. dated Dec. 3, 2020, with an English translation.

* cited by examiner

METADATA OF IMAGE DATA OBTAINED BY BRACKET IMAGING

```
IMAGE NUMBER: A001
BRACKET IMAGING TYPE: APERTURE BRACKET
BRACKET IMAGE NUMBER: F0000100
SUBJECT INFORMATION: SPORTS DAY OF ELEMENTARY SCHOOL.
LARGE NUMBER OF CHILDREN.
IMAGING DATE AND TIME INFORMATION: MM/DD/YYYY HH:MM:SS
IMAGING POSITIONAL INFORMATION: AAAAA
IMAGING EQUIPMENT INFORMATION: BBBBB
PARAMETER INFORMATION:
    SHUTTER SPEED: CCCCC
    F NUMBER: DDDD1
            ⋮
```

```
IMAGE NUMBER: A002
BRACKET IMAGING TYPE: APERTURE BRACKET
BRACKET IMAGE NUMBER: F0000100
SUBJECT INFORMATION: SPORTS DAY OF ELEMENTARY SCHOOL.
LARGE NUMBER OF CHILDREN.
IMAGING DATE AND TIME INFORMATION: MM/DD/YYYY HH:MM:SS
IMAGING POSITIONAL INFORMATION: AAAAA
IMAGING EQUIPMENT INFORMATION: BBBBB
PARAMETER INFORMATION:
    SHUTTER SPEED: CCCCC
    F NUMBER: DDDD2
            ⋮
```

METADATA OF IMAGE DATA OBTAINED BY NON-BRACKET IMAGING

```
IMAGE NUMBER: D001
BRACKET IMAGING TYPE: null
SUBJECT INFORMATION: ○○ STATION
IMAGING DATE AND TIME INFORMATION: MM/DD/YYYY HH:MM:SS
IMAGING POSITIONAL INFORMATION: AAAAA
IMAGING EQUIPMENT INFORMATION: BBBBB
PARAMETER INFORMATION:
    SHUTTER SPEED: CCCCC
    F NUMBER: DDDDD
            ⋮
```

INFORMATION PROCESSING APPARATUS, INFORMATION PROCESSING METHOD, AND INFORMATION PROCESSING PROGRAM

CROSS-REFERENCE TO RELATED APPLICATIONS

This application is a Continuation of PCT International Application No. PCT/JP2018/025652 filed on Jul. 6, 2018, which claims priority under 35 U.S.C § 119(a) to Japanese Patent Application No. 2017-173925 filed on Sep. 11, 2017. Each of the above application(s) is hereby expressly incorporated by reference, in its entirety, into the present application.

BACKGROUND OF THE INVENTION

1. Field of the Invention

The present disclosure relates to an information processing apparatus, an information processing method, and a non-transitory computer readable recording medium storing an information processing program.

2. Description of the Related Art

In recent years, an information processing apparatus comprising a storage unit that stores an imaging condition group for each positional information and each imaging time zone, an acquisition unit that acquires positional information of an imaging device, an imaging time zone, and a first imaging condition set to the imaging device is disclosed (see JP2014-120815A). The information processing apparatus extracts a second imaging condition close to the positional information and the imaging time zone acquired by the acquisition unit from the imaging condition group stored in the storage unit, and generates a third imaging condition for interpolating a difference between the extracted second imaging condition and the first imaging condition. The information processing apparatus transmits the extracted second imaging condition and the generated third imaging condition to the imaging device.

A server comprising a reception unit that receives an image and an imaging condition used at the time of imaging the image from a communication device on an information provider side and a recording unit that records the received image and imaging condition is disclosed (See JP 2004-023352A). This server receives a request to transmit the image and the imaging condition from a communication terminal on an information acquirer side, and transmits the image and the imaging condition recorded in the recording unit based on the received request to transmit the image and the imaging condition.

SUMMARY OF THE INVENTION

Incidentally, in the imaging device, bracket imaging that continuously performs imaging multiple times while step-wisely changing an imaging condition is performed in some cases. For example, in exposure bracket imaging, imaging is continuously performed multiple times while step-wisely changing an exposure amount. In such bracket imaging, there is a plurality of imaging conditions such as bracket imaging types such as exposure bracket imaging and focus bracket imaging, a range of a value of an imaging parameter to be step-wisely changed, and the number of steps. Therefore, it is difficult for a person who images to decide an appropriate bracket imaging condition corresponding to an imaging scene. Meanwhile, it is considered that an imaging condition of the bracket imaging is decided from the imaging conditions of the images obtained by the bracket imaging in the past. However, in general, the number of times of the bracket imaging is significantly less than the number of times of non-bracket imaging. Therefore, in a case where the imaging condition of the bracket imaging is decided from the imaging conditions of the images obtained by the bracket imaging in the past, there is a problem that the imaging condition of the bracket imaging may not be appropriately decided.

The present disclosure has been made in view of the above circumstances, and an object of the present disclosure is to provide an information processing apparatus, an information processing method, and a non-transitory computer readable recording medium storing an information processing program capable of appropriately deciding imaging conditions for bracket imaging.

In order to achieve the aforementioned object, an information processing apparatus of the present disclosure is an information processing apparatus that generates an imaging condition of bracket imaging that continuously performs imaging multiple times while step-wisely changing an imaging condition. The apparatus comprises a reception unit that receives information based on a captured image obtained by an imaging device, an extraction unit that extracts a plurality of image data of which a degree of similarity with a subject specified by the information received by the reception unit is equal to or greater than a predetermined value from a first image data group obtained by the bracket imaging and/or a second image data group obtained by non-bracket imaging which are accumulated in advance, a generation unit that generates the imaging condition of the bracket imaging by using the plurality of image data extracted by the extraction unit, and a transmission unit that transmits the imaging condition of the bracket imaging generated by the generation unit to the imaging device.

In the information processing apparatus of the present disclosure, the extraction unit may extract the plurality of image data from the first image data group in a case where the number of image data of which the degree of similarity with the subject is equal to or greater than a first predetermined value in the first image data group is equal to or greater than a second predetermined value, and may extract the plurality of image data from the first image data group and the second image data group in a case where the number of image data of which the degree of similarity with the subject is equal to or greater than the first predetermined value in the first image data group is less than the second predetermined value.

In the information processing apparatus of the present disclosure, the information based on the captured image may include an imaging date of the captured image, and the extraction unit may extract a plurality of image data which includes a subject matching the subject specified from the information received by the reception unit and is captured at a date identical to the imaging date from the first image data group and the second image data group.

In the information processing apparatus of the present disclosure, the transmission unit may further transmit, as an imaging condition prohibited from being selected in a case where the bracket imaging is performed by the imaging device, an imaging condition out of a range of the imaging condition of the bracket imaging generated by the generation unit to the imaging device.

In order to achieve the aforementioned object, an information processing method of the present disclosure is an information processing method of generating an imaging condition of bracket imaging that continuously performs imaging multiple times while step-wisely changing an imaging condition. The method comprises receiving information based on a captured image obtained by an imaging device, extracting a plurality of image data of which a degree of similarity with a subject specified from the received information is equal to or greater than a predetermined value from a first image data group obtained by the bracket imaging and/or a second image data group obtained by non-bracket imaging which are accumulated in advance, generating the imaging condition of the bracket imaging by using the plurality of extracted image data, and transmitting the generated imaging condition of the bracket imaging to the imaging device.

In order to achieve the aforementioned object, a non-transitory computer readable recording medium storing an information processing program of the present disclosure is a non-transitory computer readable recording medium storing an information processing program causing a computer to execute a process of generating an imaging condition of bracket imaging that continuously performs imaging multiple times while step-wisely changing an imaging condition. The process comprises receiving information based on a captured image obtained by an imaging device, extracting a plurality of image data of which a degree of similarity with a subject specified from the received information is equal to or greater than a predetermined value from a first image data group obtained by the bracket imaging and/or a second image data group obtained by non-bracket imaging which are accumulated in advance, generating the imaging condition of the bracket imaging by using the plurality of extracted image data, and transmitting the generated imaging condition of the bracket imaging to the imaging device.

An information processing apparatus of the present disclosure is a processor that generates an imaging condition of bracket imaging that continuously performs imaging multiple times while step-wisely changing an imaging condition. The processor is configured to receive information based on a captured image obtained by an imaging device, extract a plurality of image data of which a degree of similarity with a subject specified by the received information is equal to or greater than a predetermined value from a first image data group obtained by the bracket imaging and/or a second image data group obtained by non-bracket imaging which are accumulated in advance, generate the imaging condition of the bracket imaging by using the plurality of extracted image data, and transmit the generated imaging condition of the bracket imaging to the imaging device.

According to the present disclosure, it is possible to appropriately decide imaging conditions for bracket imaging.

DESCRIPTION OF THE PREFERRED EMBODIMENTS

Hereinafter, an embodiment for carrying out a technology of the present disclosure will be described in detail with reference to the drawings.

Figure 1:
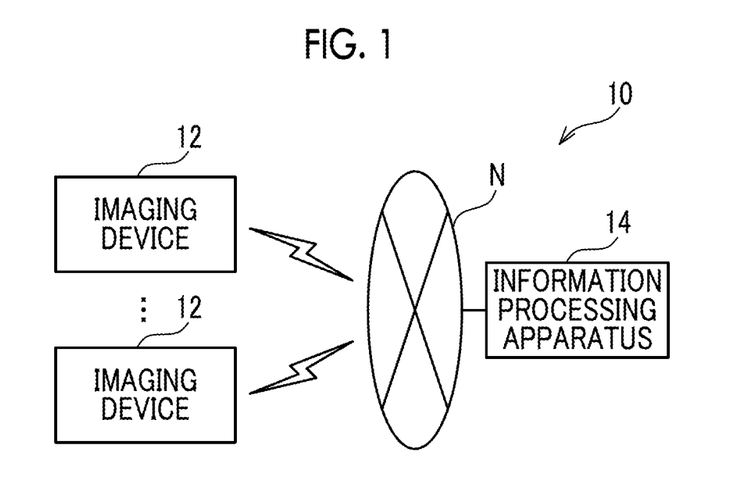
FIG. 1 is a block diagram showing an example of a configuration of an information processing system according to an embodiment.

Initially, a configuration of an information processing system 10 according to the present embodiment will be described with reference to FIG. 1. As shown in FIG. 1, the information processing system 10 according to the present embodiment includes a plurality of imaging devices 12 and an information processing apparatus 14. The imaging devices 12 are connected and the imaging device and the information processing apparatus 14 are connected to a network N so as to communicate with each other. The imaging device 12 obtains image data by imaging an image. In the present embodiment, metadata of image data indicating a captured image obtained by imaging such as exchangeable image file format (Exif) data is added to the image data. The imaging device 12 can perform bracket imaging in which imaging is continuously performed multiple times while imaging conditions are step-wisely changed. Examples of the imaging device 12 include a digital camera and a mobile phone having a camera function or the like. An example of the information processing apparatus 14 is an information processing apparatus such as a server computer or the like.

Figure 2:
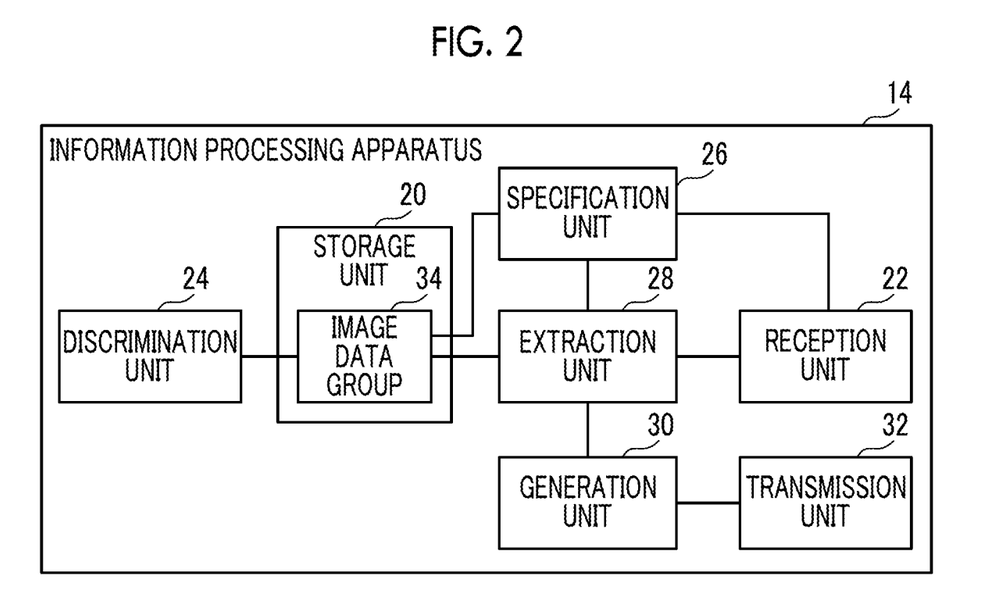
FIG. 2 is a block diagram showing an example of a functional configuration of an information processing apparatus according to the embodiment.

Next, a functional configuration of the information processing apparatus 14 according to the present embodiment will be described with reference to FIG. 2. As shown in FIG. 2, the information processing apparatus 14 according to the present embodiment comprises a storage unit 20, a reception unit 22, a discrimination unit 24, a specification unit 26, an extraction unit 28, a generation unit 30, and a transmission unit 32.

An image data group 34 is accumulated in the storage unit 20 in advance. The image data group 34 according to the present embodiment includes a first image data group obtained by bracket imaging and a second image data group obtained by non-bracket imaging. Image data indicating a captured image captured by the imaging device 12 and metadata of the image data are included in each of the first image data group and the second image data group. Image data which are released on the Internet and are acquired via the network N and metadata of the image data are included in each of the first image data group and the second image data group.

The reception unit 22 according to the present embodiment receives information based on the captured image captured by the imaging device 12. In the present embodiment, the reception unit 22 receives, as the information based on the captured image, image data indicating the captured image captured by the imaging device 12 and metadata of the image data. Imaging date and time information indicating an imaging date and time, imaging positional information indicating an imaging position (for example, latitude and longitude), and imaging material information indicating a manufacturer name and a model number of the imaging device 12 are included in the metadata according to the present embodiment. Parameter information indicating imaging parameters such as a shutter speed, an F number, International Organization for Standardization (ISO) sensitivity, flash intensity, a focal length, and an exposure mode are further included in the metadata according to the present embodiment.

The discrimination unit 24 according to the present embodiment discriminates whether each image data is the image data obtained by the bracket imaging or the image data obtained by the non-bracket imaging by using the metadata of each image data in the image data group 34.

In the present embodiment, the discrimination unit 24 discriminates whether or not the image data is a captured image obtained by exposure bracket imaging from information of the exposure mode of the parameter information included in the metadata. The discrimination unit 24 discriminates that image data of which the imaging dates and times indicated by the imaging date and time information of the metadata are within a predetermined range (for example, within a range of five seconds) and values of one imaging parameter are step-wisely different are the image data obtained by the bracket imaging. In this case, the discrimination unit 24 discriminates that one imaging parameter of which values are step-wisely different is a bracket imaging type.

Specifically, for example, the discrimination unit 24 discriminates that a plurality of image data of which the imaging dates and times are within a range of 5 seconds, the shutter speeds are step-wisely different, and the values of the imaging parameters other than the shutter speed are identical are the image data obtained by shutter speed bracket imaging. The discrimination unit 24 discriminates that image data other than the image data of the image data group 34 discriminated as the image data obtained by the bracket imaging are the image data obtained by the non-bracket imaging.

The discrimination unit 24 adds a discrimination result as to whether or not the image data is obtained by the bracket imaging to the metadata of each image data. The discrimination unit 24 adds a unique image number to the metadata of each image data. The discrimination unit 24 adds a unique bracket image number that is common to the image data obtained by the bracket imaging to the metadata of the image data discriminated as the image data obtained by the bracket imaging. Hereinafter, the image data discriminated as the image data obtained by the bracket imaging by the discrimination unit 24 is referred to as "bracket image data", and the image data discriminated as the image data obtained by the non-bracket imaging is referred to as "non-bracket image data".

The discrimination unit 24 may discriminate whether each image data of the image data group 34 is the image data obtained by the bracket imaging or the image data obtained by the non-bracket imaging by using a discriminant model obtained by machine learning in advance. In this case, for example, a discriminant model to be described below is created in advance by machine learning using teaching data including the plurality of image data obtained by the bracket imaging and the metadata. That is, in this case, the discriminant model in which the image data and the metadata are used as inputs and information indicating whether the image data is obtained by the bracket imaging or the non-bracket imaging and the bracket imaging type in a case where the image data is obtained by the bracket imaging are used as outputs is created in advance.

The specification unit 26 specifies a subject in the image by performing known image analysis processing on each image indicated by each image data of the image data group 34, and generates subject information indicating the specified subject. The specification unit 26 adds the generated subject information to the metadata of the corresponding image data. Similarly, the specification unit 26 specifies a subject in the image by performing the known image analysis processing on the image indicated by the image data (hereinafter, referred to as "received image data") received by the reception unit 22, and generates subject information indicating the specified subject. The specification unit 26 adds the generated subject information to the metadata of the received image data. Specifically, for example, the specification unit 26 generates subject information shown below from an image in which a person sits on an opposite side of a person who images in a restaurant and pizza and wine on a table appear. That is, in this case, the specification unit 26 generates the subject information including "restaurant", "person", "pizza", and "wine".

Figure 3:
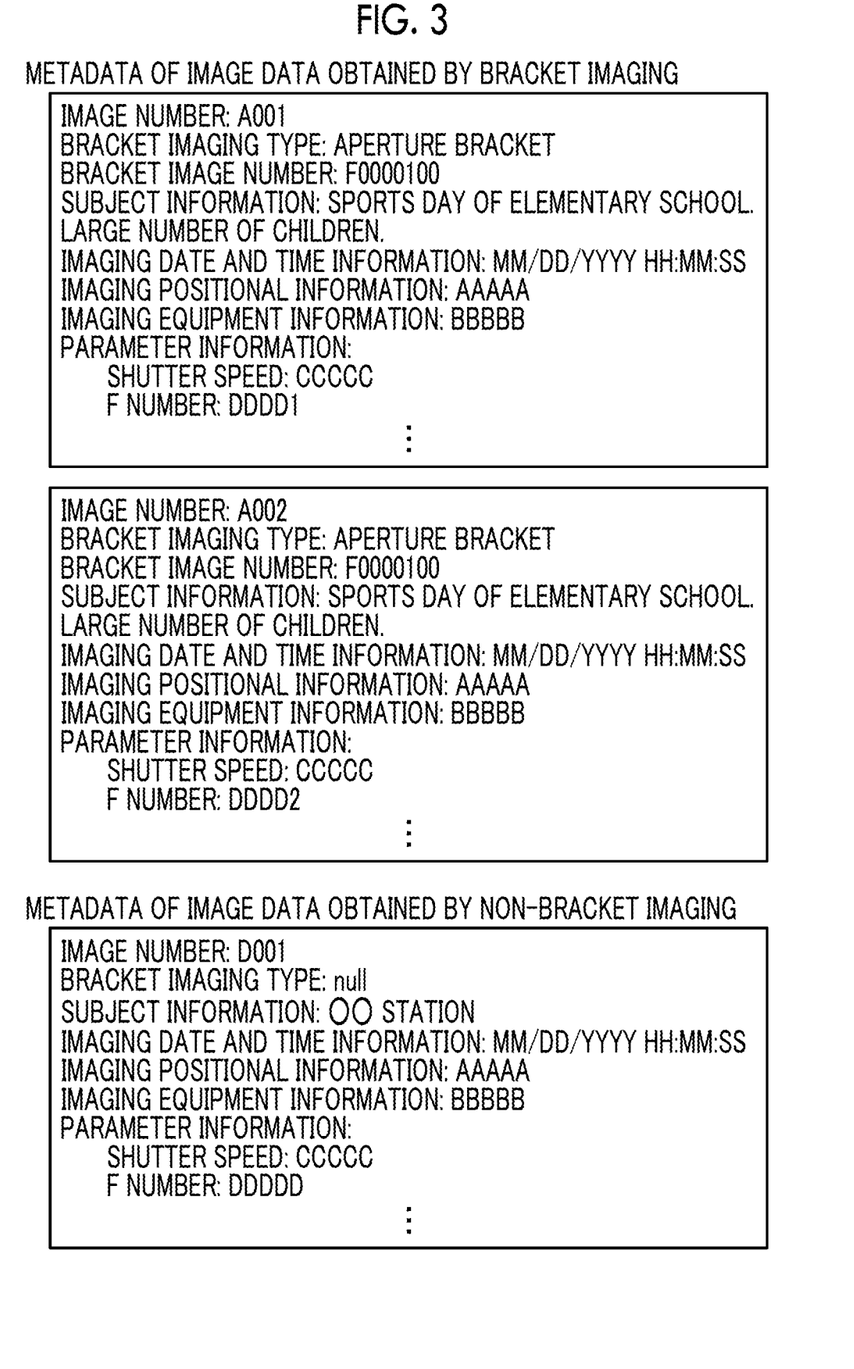
FIG. 3 is a diagram for describing metadata according to the embodiment.

FIG. 3 shows examples of the metadata. As shown in at an upper portion of FIG. 3, the image number, the bracket imaging type, and the bracket image number added by the discrimination unit 24 are included in the metadata of the bracket image data according to the present embodiment. FIG. 3 shows the metadata of the bracket image data discriminated by the discrimination unit 24 that the bracket imaging type is "aperture bracket".

As shown at a lower portion of FIG. 3, the image number and the bracket imaging type added by the discrimination unit 24 are included in the metadata of the non-bracket image data according to the present embodiment. As shown at the lower portion of FIG. 3, "null" indicating that the image data is obtained by the non-bracket imaging is added, as the bracket imaging type, to the metadata of the non-bracket image data by the discrimination unit 24.

As shown at the upper and lower portions of FIG. 3, the subject information added by the specification unit 26 is included in the metadata of each image data in the image data group 34.

In a case where the number of image data of which a degree of similarity with the subject specified from the received image data is equal to or greater than a first predetermined value in the first image data group is equal to or greater than a second predetermined value, the extraction unit 28 according to the present embodiment extracts a plurality of bracket image data of which a degree of similarity with the subject is equal to or greater than the first predetermined value from the first image data group. Specifically, in a case where the number of bracket image data corresponding to the metadata of the first image data group including the subject information indicating the subject matching the subject specified by the subject information generated for the received image data by the specification unit 26 is equal to or greater than the second predetermined value, the extraction unit 28 extracts the plurality of bracket image data from the first image data group. For example, the second predetermined value in this case includes a statistically significant number of 2 or more. The first predetermined value and the second predetermined value may be set by the user.

The extraction unit 28 may use, as the degree of similarity, the number of matching subjects and a matching rate of the subjects or the like included respectively in the subject information of the received image data and the bracket image data. For example, the extraction unit 28 may apply, as the degree of similarity, the number of matching feature points extracted respectively from the received image data and the bracket image data. For example, the extraction unit 28 may apply, as the degree of similarity, a higher value as the imaging dates and times of the received image data and the bracket image data are closer, or may apply a higher value as the imaging positions thereof are closer.

Meanwhile, in a case where the number of image data of which the degree of similarity with the subject is equal to or greater than the first predetermined value in the first image data group is less than the second predetermined value, the extraction unit 28 extracts the plurality of image data of which the degree of similarity with the subject is equal to or greater than the first predetermined value from both the first image data group and the second image data group.

The generation unit 30 according to the present embodiment generates imaging conditions of the bracket imaging by using the plurality of image data extracted by the extraction unit 28. Specifically, the generation unit 30 initially decides, as the bracket imaging type corresponding to the received image data, the largest type among the bracket imaging types of the image data of the bracket imaging extracted by the extraction unit 28. The bracket imaging type may be set by the person who images by using the imaging device 12, and may be transmitted together with the image data from the imaging device 12 to the information processing apparatus 14.

Subsequently, the generation unit 30 decides a value of the imaging parameter to be step-wisely changed in a case where the bracket imaging of the decided bracket imaging type is performed. A method for deciding the shutter speed in a case where the bracket imaging type decided by the generation unit 30 is the shutter speed bracket imaging will be described as an example with reference to FIG. 4.

Figure 4:
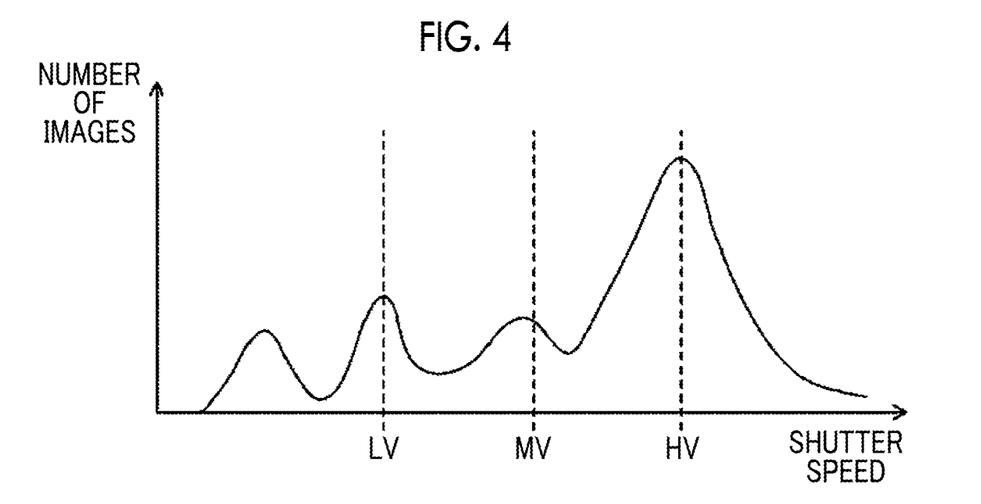
FIG. 4 is a graph showing an example of a frequency distribution of shutter speeds according to the embodiment.

For example, as shown in FIG. 4, the generation unit 30 according to the present embodiment generates a frequency distribution of the shutter speeds by using the metadata of each image data extracted by the extraction unit 28. The generation unit 30 may give weights to the image data such that a priority of the bracket image data is higher than a priority of the non-bracket image data at the time of generating the frequency distribution.

The generation unit 30 specifies two maximum values of a first maximum value and a second maximum value among maximum values of the frequency (that is, the number of images) based on the generated frequency distribution. The generation unit 30 decides, as an upper limit value HV of the shutter speed in the shutter speed bracket imaging, the shutter speed having the larger value among the shutter speeds corresponding to the two specified maximum values. The generation unit 30 decides, as a lower limit value LV of the shutter speed in the shutter speed bracket imaging, the shutter speed having the smaller value among the shutter speeds corresponding to the two specified maximum values. The generation unit 30 may specify two maximum values such as the first maximum value and a third maximum value other than the first maximum value and the second maximum value among the maximum values.

The generation unit 30 decides, as a shutter speed between the upper limit value HV and the lower limit value LV in the shutter speed bracket imaging, a value obtained by equally dividing a value between the upper limit value HV and the lower limit value LV according to the number of steps of changing the shutter speed. In FIG. 4, an example in which the number of steps is 3 and a value MV obtained by equally dividing the value between the upper limit value HV and the lower limit value LV is decided as the shutter speed between the upper limit value HV and the lower limit value LV in the shutter speed bracket imaging is illustrated.

The method for deciding the number of steps in the bracket imaging is not particularly limited. For example, the number of steps in the bracket imaging may be decided in advance, or may be decided by a mode value of the number of images obtained by the series of bracket imaging in the first image data group may be applied.

For example, the generation unit 30 may decide the bracket imaging type and the value of the imaging parameter to be step-wisely changed by using a decision model obtained in advance by machine learning. In this case, for example, a decision model to be described below is created in advance by the machine learning using the teaching data including the plurality of image data and the metadata obtained by the bracket imaging. That is, in this case, a decision model in which the plurality of image data and the metadata are used as inputs and the bracket imaging type and the value of the imaging parameter to be step-wisely changed are used as outputs is created in advance.

The transmission unit 32 according to the present embodiment transmits the imaging conditions of the bracket imaging generated by the generation unit 30 to the imaging device 12. In the present embodiment, the transmission unit 32 transmits, as the imaging conditions of the bracket imaging, the bracket imaging type decided by the generation unit 30 and the value of the imaging parameter to be step-wisely changed to the imaging device 12. The transmission unit 32 transmits, as imaging conditions prohibited from being selected in a case where the bracket imaging is performed by the imaging device 12, imaging conditions out of the range of the bracket imaging conditions generated by the generation unit 30 to the imaging device 12. For example, in the example shown in FIG. 4, the transmission unit 32 transmits, as imaging conditions prohibited from being selected in a case where the shutter speed bracket imaging is performed, a range of the shutter speed which is less than the lower limit value LV and a range of the shutter speed which exceeds the upper limit value HV to the imaging device 12.

The imaging device 12 receives the imaging conditions of the bracket imaging transmitted from the information processing apparatus 14 and the imaging conditions prohibited from being selected in a case where the bracket imaging is performed. The imaging device 12 notifies the person who images by displaying the received imaging conditions of the bracket imaging on a display unit (not shown). The person who images visually confirms the imaging conditions displayed on the display unit, and performs the bracket imaging under the imaging conditions in a case where there is no problem. In a case where the person who images wants to correct the imaging conditions, the person who images corrects the values of the imaging parameters in the bracket imaging displayed on the display unit. At this time, for example, the received imaging conditions prohibited from being selected are grayed out on the display unit so as not to be selected by the person who images. The imaging device 12 may perform the bracket imaging according to the received imaging conditions of the bracket imaging without notifying the person who images. For example, the imaging device 12 may decide imaging parameters other than the imaging parameters to be step-wisely changed which are transmitted from the information processing apparatus 14 in an auto imaging mode corresponding to an imaging scene.

Figure 5:
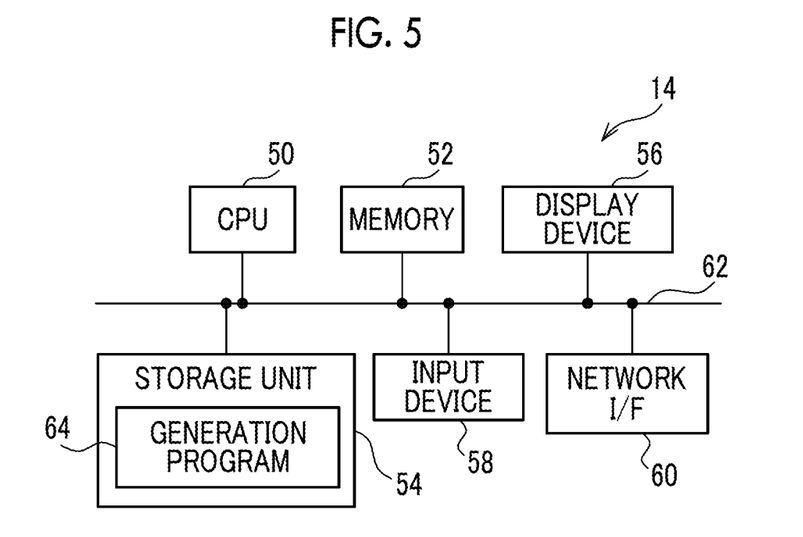
FIG. 5 is a block diagram showing an example of a main configuration of an electrical system of the information processing apparatus according to the embodiment.

Next, a hardware configuration of the information processing apparatus 14 will be described with reference to FIG. 5. The information processing apparatus 14 is realized by a computer shown in FIG. 5. As shown in FIG. 5, the information processing apparatus 14 comprises a central processing unit (CPU) 50, a memory 52 as a temporary storage region, and a nonvolatile storage unit 54. The information processing apparatus 14 comprises a display device 56 such as a liquid crystal display, an input device 58 such as a keyboard and a mouse, and a network interface (I/F) 60 connected to a network N. The CPU 50, the memory 52, the storage unit 54, the display device 56, the input device 58, and the network I/F 60 are connected via a bus 62.

The storage unit 54 is realized by a hard disk drive (HDD), a solid state drive (SSD), or a flash memory. A generation program 64 is stored in the storage unit 54 as a storage medium. The CPU 50 reads out the generation program 64 from the storage unit 54, loads the read generation program 64 in the memory 52, and executes the generation program. The CPU 50 functions as the reception unit 22, the discrimination unit 24, the specification unit 26, the extraction unit 28, the generation unit 30, and the transmission unit 32 shown in FIG. 2 by executing the generation program 64. The storage unit 20 shown in FIG. 2 is realized by the storage unit 54 shown in FIG. 5.

Figure 6:
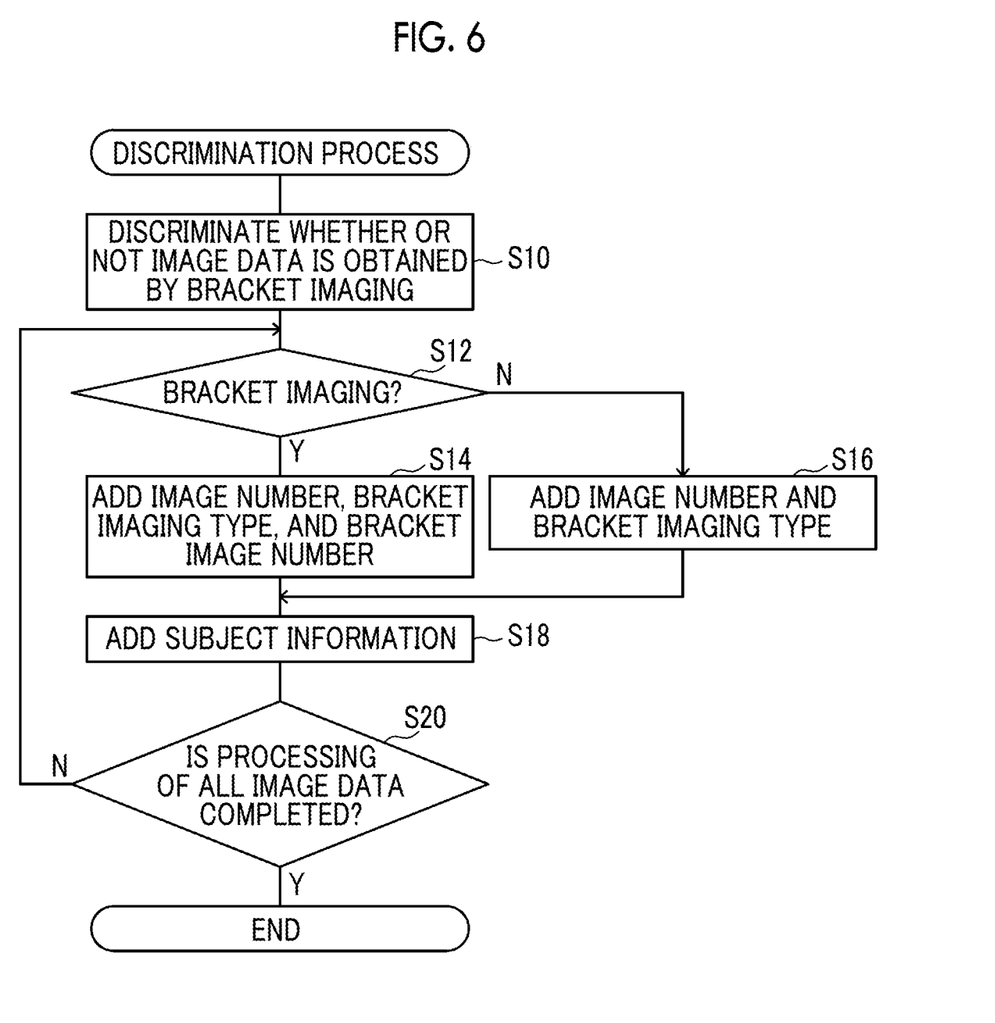
FIG. 6 is a flowchart showing an example of a discrimination process according to the embodiment.
Figure 7:
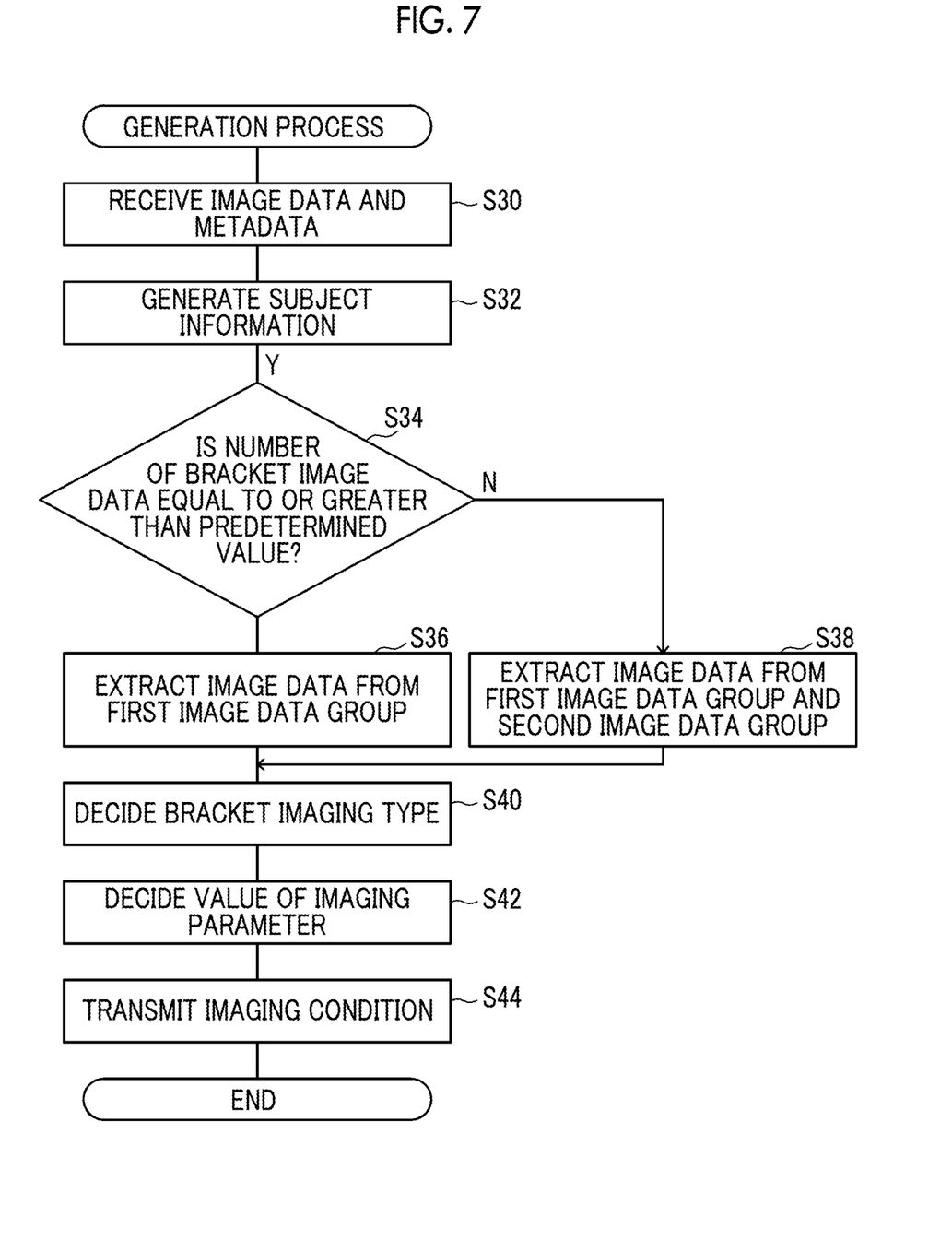
FIG. 7 is a flowchart showing an example of a generation process according to the embodiment.

Next, an operation of the information processing apparatus 14 according to the present embodiment will be described with reference to FIGS. 6 and 7. The information processing apparatus 14 performs a discrimination process shown in FIG. 6 and a generation process shown in FIG. 7 by executing the generation program 64. The discrimination process shown in FIG. 6 is performed, for example, in a case where a command to start performing the discrimination process is input via the input device 58. The generation process shown in FIG. 7 is performed in a case where the information processing apparatus 14 receives, for example, the image data transmitted by the imaging device 12 and metadata of the image data.

In step S10 of FIG. 6, the discrimination unit 24 discriminates whether each image data is the image data obtained by the bracket imaging or the image data obtained by the non-bracket imaging by using the metadata of each image data in the image data group 34, as described above. As described above, the discrimination unit 24 also discriminates the bracket imaging type of the image data discriminated as the image data obtained by the bracket imaging. The following processing of steps S12 to S18 is repeatedly performed by using each image data in the image data group 34 as a processing target. At the time of repeatedly performing the processing of steps S12 to S18, the image data which are not used as the processing targets are used as the processing targets.

In step S12, the discrimination unit 24 determines whether or not it is discriminated that the image data as the processing target is the image data obtained by the bracket imaging in step S10. In a case where this determination is a positive determination, the processing proceeds to step S14, and in a case where the determination is a negative determination, the process proceeds to step S16.

In step S14, the discrimination unit 24 adds the image number, the bracket imaging type discriminated in step S10, and the bracket image number to the metadata of the image data as the processing target. Meanwhile, in step S16, the discrimination unit 24 adds the image number to the metadata of the image data as the processing target, and adds "null" as the bracket imaging type.

In step S18, the specification unit 26 specifies the subject in the image by performing the known image analysis processing on the image indicated by the image data of the processing target, and generates the subject information indicating the specified subject. The specification unit 26 adds the generated subject information to the metadata of the image data as the processing target. In step S20, the discrimination unit 24 determines whether or not the processing of steps S12 to S18 is completed for all the image data in the image data group 34. In a case where this determination is a negative determination, the process returns to step S12, and in a case where the determination is a positive determination, the present discrimination process is ended.

In step S30 of FIG. 7, the reception unit 22 receives the image data transmitted by the imaging device 12 and the metadata of the image data. In step S32, the specification unit 26 specifies the subject in the image by performing the known image analysis processing on the image indicated by the image data received in step S30, and generates the subject information indicating the specified subject.

In step S34, the extraction unit 28 determines whether or not the number of image data of which the degree of similarity with the subject specified by the subject information generated in step S32 is equal to or greater than the first predetermined value in the first image data group is equal to or greater than the second predetermined value, as described above. In a case where this determination is a positive determination, the process proceeds to step S36, and in a case where the determination is a negative determination, the process proceeds to step S38.

In step S36, the extraction unit 28 extracts the plurality of bracket image data of which the degree of similarity with the subject specified by the subject information generated in step S32 is equal to or greater than the first predetermined value from the first image data group. Meanwhile, in step S38, the extraction unit 28 extracts the plurality of image data of which the degree of similarity with the subject specified by the subject information generated in step S32 is equal to or greater than the first predetermined value from the first image data group and the second image data group.

In step S40, the generation unit 30 decides the bracket imaging type by using the plurality of image data extracted in step S36 or step S38, as described above. In step S42, the generation unit 30 decides the value of the imaging parameter to be step-wisely changed in a case where the bracket imaging of the bracket imaging type decided in step S40 is performed by using the plurality of image data extracted in step S36 or step S38, as described above.

In step S44, the transmission unit 32 transmits, as the imaging conditions of the bracket imaging, the bracket imaging type decided in step S40 and the value of the imaging parameter decided in step S42 to the imaging device 12. As described above, the transmission unit 32 transmits, as the imaging conditions prohibited from being selected in a case where the bracket imaging is performed by the imaging device 12, the imaging condition out of the range of the imaging conditions of the bracket imaging to the imaging device 12. In a case where the processing of step S44 is ended, the present generation process is ended.

As described above, according to the present embodiment, the plurality of image data of which the degree of similarity with the subject specified from the subject information is equal to or greater than the predetermined value are extracted from the first image data group obtained by the bracket imaging and the second image data group obtained by the non-bracket imaging. The imaging conditions of the bracket imaging are generated by using the plurality of extracted image data, and the generated imaging conditions of the bracket imaging are transmitted to the imaging device. Accordingly, it is possible to appropriately decide the imaging conditions of the bracket imaging.

In the aforementioned embodiment, the extraction unit 28 may extract the plurality of image data which includes the subject matching the subject specified by the subject information generated from the received image data and is captured at the imaging date identical to that of the received image data from the first image data group and the second image data group. In this case, for example, the imaging conditions of the bracket imaging at a time at which a certain person images a train at A station by the bracket imaging can be used by another person who images at B station.

In the above-described embodiment, the upper limit value and the lower limit value of the imaging parameter to be step-wisely changed in a case where the bracket imaging is performed may be transmitted to the imaging device 12. In this case, a mode in which the imaging device 12 decides how many steps the imaging parameter is changed within the range of the received upper limit value and lower limit value is illustrated.

Various kinds of processors other than the CPU may execute the discrimination process and the generation process executed by the CPU that executes software (program) in the aforementioned embodiment. A dedicated electric circuit which is a processor having a circuit configuration designed as a dedicated circuit in order to perform specific processing such as programmable logic device (PLD) and application specific integrated circuit (ASIC) of which a circuit configuration can be changed after field-programmable gate array (FPGA) is manufactured is used as the processor in this case. The discrimination process and the generation process may be performed by one of these various processors, or a combination of two or more processors of the same kind or different kinds (for example, a plurality of FPGAs, and a combination of a CPU and an FPGA). Hardware structures of these various processors are more specifically electric circuits in which circuit elements such as semiconductor elements are combined.

Although it has been described in the aforementioned embodiment that the generation program 64 is stored (installed) in the storage unit 54 in advance, the present invention is not limited thereto. The generation program 64 may be provided in a form recorded on a recording medium such as a compact disk read only memory (CD-ROM), a digital versatile disk read only memory (DVD-ROM), and a universal serial bus (USB) memory. The generation program 64 may be downloaded from an external device via a network.

EXPLANATION OF REFERENCES

10: information processing system
12: imaging device
14: information processing apparatus
20, 54: storage unit
22: reception unit
24: discrimination unit
26: specification unit
28: extraction unit
30: generation unit
32: transmission unit
34: image data group
50: CPU
52: memory
56: display device
58: input device
60: network I/F
62: bus
64: generation program HV: upper limit value
LV: lower limit value
MV: value
N: network

What is claimed is:

1. An information processing apparatus that generates an imaging condition of bracket imaging that continuously performs imaging multiple times while step-wisely changing an imaging condition, the apparatus comprising:
   a reception unit that receives information based on a captured image obtained by an imaging device;
   an extraction unit that extracts a plurality of image data of which a degree of similarity with a subject specified by the information received by the reception unit is equal to or greater than a predetermined value from a first image data group obtained by the bracket imaging and/or a second image data group obtained by non-bracket imaging which are accumulated in advance;
   a generation unit that generates the imaging condition of the bracket imaging by using the plurality of image data extracted by the extraction unit; and
   a transmission unit that transmits the imaging condition of the bracket imaging generated by the generation unit to the imaging device.

2. The information processing apparatus according to claim 1,
   wherein the extraction unit extracts the plurality of image data from the first image data group in a case where the number of image data of which the degree of similarity with the subject is equal to or greater than a first predetermined value in the first image data group is equal to or greater than a second predetermined value, and extracts the plurality of image data from the first image data group and the second image data group in a case where the number of image data of which the degree of similarity with the subject is equal to or greater than the first predetermined value in the first image data group is less than the second predetermined value.

3. The information processing apparatus according to claim 1,
   wherein the information based on the captured image includes an imaging date of the captured image, and
   the extraction unit extracts a plurality of image data which includes a subject matching the subject specified from the information received by the reception unit and is captured at a date identical to the imaging date from the first image data group and/or the second image data group.

4. The information processing apparatus according to claim 2,
   wherein the information based on the captured image includes an imaging date of the captured image, and
   the extraction unit extracts a plurality of image data which includes a subject matching the subject specified from the information received by the reception unit and is captured at a date identical to the imaging date from the first image data group and/or the second image data group.

5. The information processing apparatus according to claim 1,
   wherein the transmission unit further transmits, as an imaging condition prohibited from being selected in a case where the bracket imaging is performed by the imaging device, an imaging condition out of a range of the imaging condition of the bracket imaging generated by the generation unit to the imaging device.

6. The information processing apparatus according to claim 2,
wherein the transmission unit further transmits, as an imaging condition prohibited from being selected in a case where the bracket imaging is performed by the imaging device, an imaging condition out of a range of the imaging condition of the bracket imaging generated by the generation unit to the imaging device.

7. The information processing apparatus according to claim 3,
wherein the transmission unit further transmits, as an imaging condition prohibited from being selected in a case where the bracket imaging is performed by the imaging device, an imaging condition out of a range of the imaging condition of the bracket imaging generated by the generation unit to the imaging device.

8. The information processing apparatus according to claim 4,
wherein the transmission unit further transmits, as an imaging condition prohibited from being selected in a case where the bracket imaging is performed by the imaging device, an imaging condition out of a range of the imaging condition of the bracket imaging generated by the generation unit to the imaging device.

9. An information processing method of generating an imaging condition of bracket imaging that continuously performs imaging multiple times while step-wisely changing an imaging condition by using information processing apparatus according to claim 1, the method comprising:
receiving information based on a captured image obtained by an imaging device;
extracting a plurality of image data of which a degree of similarity with a subject specified from the received information is equal to or greater than a predetermined value from a first image data group obtained by the bracket imaging and/or a second image data group obtained by non-bracket imaging which are accumulated in advance;
generating the imaging condition of the bracket imaging by using the plurality of extracted image data; and
transmitting the generated imaging condition of the bracket imaging to the imaging device.

10. A non-transitory computer readable recording medium storing an information processing program causing a computer to execute a process of generating an imaging condition of bracket imaging that continuously performs imaging multiple times while step-wisely changing an imaging condition, the processes comprising:
receiving information based on a captured image obtained by an imaging device;
extracting a plurality of image data of which a degree of similarity with a subject specified from the received information is equal to or greater than a predetermined value from a first image data group obtained by the bracket imaging and/or a second image data group obtained by non-bracket imaging which are accumulated in advance;
generating the imaging condition of the bracket imaging by using the plurality of extracted image data; and
transmitting the generated imaging condition of the bracket imaging to the imaging device.

11. An information processing apparatus comprising a processor executing a process of generating an imaging condition of bracket imaging that continuously performs imaging multiple times while step-wisely changing an imaging condition,
the processor configured to
receive information based on a captured image obtained by an imaging device;
extract a plurality of image data of which a degree of similarity with a subject specified from the received information is equal to or greater than a predetermined value from a first image data group obtained by the bracket imaging and/or a second image data group obtained by non-bracket imaging which are accumulated in advance;
generate the imaging condition of the bracket imaging by using the plurality of extracted image data; and
transmit the generated imaging condition of the bracket imaging to the imaging device.

* * * * *